Aug. 12, 1941.  A. E. HINTERMEYER  2,252,005

CUTTING TOOL

Filed Sept. 2, 1938

Inventor

Alfred E. Hintermeyer

By *Geo. H. Kennedy Jr.*

Attorney

Patented Aug. 12, 1941

2,252,005

UNITED STATES PATENT OFFICE 2,252,005

CUTTING TOOL

Alfred E. Hintermeyer, Worcester, Mass., assignor to The Heald Machine Company, Worcester, Mass., a corporation of Massachusetts Application September 2, 1938, Serial No. 228,189

4 Claims. (Cl. 29—95)

The present invention relates to cutting tools and particularly to tools for boring or turning, consisting of a tool bit of cemented tungsten carbide, or other hard material, mounted in a holder. This application is a division of my copending application Serial No. 108,416, filed October 30, 1936 now Patent No. 2,130,684, dated September 20, 1938.

Tool bits of cemented tungsten carbide are generally mounted in a tool holder formed from steel or some similar plentiful and inexpensive material to reduce the cost of the cutting tool. The tool bit is usually placed in a slot in the end of the holder and held therein as by brazing. For a more secure attachment of the tool bit to the holder, my aforesaid parent application provides a tool bit which is arranged in a recess in the end of the tool holder and supported on all sides by the material of the holder.

The tool bit, when being sharpened, has portions thereof cut away, not only on the sides, but on the upper surface thereof, and especially where the bit is cylindrical, the amount of material removed from the upper portion to provide the desired top surface is considerable. To avoid this waste of the expensive tungsten carbide, the present invention provides for the filling of the tool holder recess by a two-part structure, one part of which is tungsten carbide, the other part being steel or other inexpensive material. In this manner the steel or other inexpensive material is ground away in producing the top surface for the cutting point of the tool bit.

Other and further objects and advantages of the present invention will more fully appear from the following detailed description taken in connection with the accompanying drawing, in which—

Like reference characters refer to like parts in the different figures.

Figure 1:
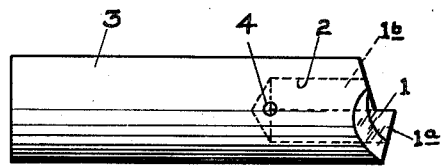
Fig. 1 is a side elevation of a tool bit and holder embodying the invention.
Figure 2:
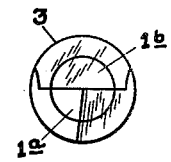
Fig. 2 is an end view of Fig. 1.

Fig. 1 shows a tool holding member 3, having in its end a cylindrical recess 2 adapted to receive the two-part structure 1 that includes the tool bit, so that the tool bit is supported by the material of the holder on all sides thereof, as will be apparent from the showing of Fig. 2. The tool bit itself does not take the lateral thrust resulting from the boring or turning action of the tool, but instead, the lateral thrust is taken by the material forming the holder. It will be apparent that the bore or recess 2 may be of any desired cross-section so long as the two-part structure 1 and the bore are both of the same approximate shape. A small lateral opening 4 is provided in the tool holder adjacent the base of the recess 2 to provide for the escape of air when the tool bit is inserted within the holder.

The tool bit structure comprises a tool bit 1a which is substantially semi-circular in cross-section and a correspondingly shaped filler piece 1b of steel or other inexpensive material. The tool bit and filler piece together correspond in cross-section to the recess 2. Obviously a cylindrical bore is the most easily formed recess for the bit since it can readily be drilled; however, the recess may as readily be of any other desired cross-section, such as hexagonal, and in this event the bit 1a and filler piece 1b will each be so shaped that when placed in side-by-side relation the combined cross-section will be the same as that of the recess. The tool bit is preferably of tungsten carbide or other extremely hard material; the filler piece may be of soft steel or other inexpensive material.

One of the best methods for mounting the tool bit within the holder without the necessity for subjecting the bit to a direct heating flame is by shrinking the holder. In this method, the diameter of the bit 1a and that of the filler piece 1b is slightly greater than the diameter of the recess 2 on the order of one or two thousandths of an inch. By heating the holder the recess 2 will be temporarily expanded enough to allow the tool bit and filler piece to be readily inserted in the bore with the air escaping through the opening 4. The holder is allowed to cool after the bit is positioned therein and the tool bit is accordingly held securely in position. The bit is obviously not subjected to any direct heat during the mounting of the bit.

Figure 3:
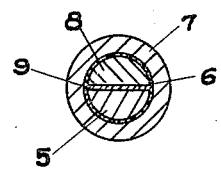
Fig. 3 is a sectional view of a modified form of tool bit and holder.

In Fig. 3 is shown a modification of the tool of Figs. 1 and 2. The tool bit 5 is semi-circular in cross-section and the cylindrical recess 6 in the holder 7 is substantially filled by the semi-circular tool bit and a similarly shaped semi-circular steel insert 8. The combined radii of the steel insert and the tool bit in this arrangement are slightly less than the diameter of the bore, and a brazing alloy 9, which, when melted, is carried by capillary attraction around and between the bit and the insert, provides for a secure mounting of the bit within the bore of the holder. This arrangement requires the use of only one-half the usual amount of material forming the cutting tool, since the tool bit occupies only a part of the recess.

Obviously the cutting tool is sharpened by cutting away the outer portions of the holder, together with parts of the tool bit, to obtain the desired side surfaces for the cutting point, and the filler piece is then cut away, as shown in Fig. 1, so that the flat side of the tool bit forms the upper flat surface of the cutting point. It will be understood that, since the filler piece is of inexpensive material, the cost of the tool is less than if the tool bit entirely filled the recess in the tool holder. The cutting away of the filler piece for defining the top or upper surface for the cutting point avoids the wasting of the expensive material of the tool bit, and only a small amount of the top surface of the tool bit needs to be cut away to produce the desired sharp cutting point.

I claim:

1. In a cutting tool, a holder having a cylindrical recess positioned axially therein and of substantially uniform cross-section throughout its depth, and a tool bit and a filler block in said recess, said block and bit being each substantially uniform in cross-section throughout its length and together corresponding substantially in cross-section to the recess.

2. In a cutting tool, a holder having a cylindrical recess positioned axially therein and of substantially uniform cross-section throughout its depth, and a tool bit and a filler block in said recess, said block and bit being each substantially semi-circular in cross-section throughout its length and together corresponding substantially in cross-section to the recess.

3. In a cutting tool, a holder having a cylindrical recess positioned axially therein and of substantially uniform cross-section throughout its depth, and a tool bit and a filler block in said recess, said block and bit being each substantially semi-circular in cross-section throughout its length and together corresponding substantially in cross-section to the recess, and a brazing alloy between said filler and bit and in the space surrounding the bit and filler piece within the recess for holding said filler piece and bit in position.

4. In a cutting tool, a holder having an elongated recess extending axially therein, a tool bit and a filler block positioned side-by-side in the recess and each extending substantially the length thereof, said bit and block together corresponding in cross-sectional area and dimension to the cross-section of the recess throughout its length, said bit and block being each substantially uniform in cross-section throughout its length.

ALFRED E. HINTERMEYER.